United States Patent
Kosugi

(10) Patent No.: US 6,879,839 B2
(45) Date of Patent: Apr. 12, 2005

(54) RADIO COMMUNICATION SYSTEM

(75) Inventor: Junichi Kosugi, Saitama (JP)

(73) Assignee: NEC Corporation, Tokyo (JP)

( * ) Notice: Subject to any disclaimer, the term of this patent is extended or adjusted under 35 U.S.C. 154(b) by 550 days.

(21) Appl. No.: 09/774,635

(22) Filed: Feb. 1, 2001

(65) Prior Publication Data
US 2001/0011011 A1 Aug. 2, 2001

(30) Foreign Application Priority Data
Feb. 2, 2000 (JP) .......................................... 2000-025128

(51) Int. Cl.[7] .............................................. H04Q 7/20
(52) U.S. Cl. ...................................... 455/522; 370/335
(58) Field of Search .................. 455/522, 69; 370/229, 370/230, 235, 335, 342

(56) References Cited

U.S. PATENT DOCUMENTS 6,389,296 B1    5/2002  Shiraki et al.
6,510,148 B1 *  1/2003  Honkasalo ................... 370/342
2003/0128674 A1 * 7/2003  Kong et al. .................. 370/320

FOREIGN PATENT DOCUMENTS

| JP | A 11-74835  | 3/1999 |
| JP | A 11-112416 | 4/1999 |
| JP | A 11-150509 | 6/1999 |

* cited by examiner

Primary Examiner—Lee Nguyen
(74) Attorney, Agent, or Firm—Young & Thompson

(57) ABSTRACT

The disconnection ratio of calls of a mobile terminal is reduced when the mobile terminal during communication is located far from a base station and the propagation loss of a radio line increases. In the mobile terminal, when a transmission-power value from a transmission power control unit becomes maximum, a transmission data control unit inputs power control bits "0" and "1" read by a power control bit reading unit and a counter counts the power control bit "0". If a counted value of the counter exceeds a threshold, the transmission data control unit stops transmission of data through a reverse supplemental channel and switches data transmission to data transmission only through a reverse fundamental channel.

11 Claims, 8 Drawing Sheets

RADIO COMMUNICATION SYSTEM

BACKGROUND OF THE INVENTION

The present invention relates to a radio communication system for radio communication which comprises a base station and a mobile terminal, and is based on a COMA system.

An IS-95A system and an IS-95B system are well-known as such a radio communication system. In the IS-95A system, a radio line which a mobile terminal uses for communication is called a traffic channel. In the CDMA method, necessary qualifies of communication through communication channels must be at the lowest level so as to assure a line capacity. For this purpose, a fast power control is requested for, in particular, a reverse line. In the IS-95A system, in order to assure the line capacity, a power control signal "power control bit" is inserted to a forward traffic channel to receive signals from all mobile terminals at a base station with the same quality, thereby controlling transmission powers of the mobile terminals.

If the signal received by one base station has an insufficient-quality signal, the base station inserts "0" to the forward traffic channel as the power control bit and transmits it. If the signal received by one base station has an excessive-quality signal, the base station inserts "1" to the forward traffic channel as the power control bit and transmits it. When the power control bit "0" is received, the mobile terminal increases the transmission power. When the power control bit "1" is received, the mobile terminal decreases the transmission power. In the IS-95A system, because a maximum value of the transmission power of the mobile terminal is determined, the transmission power of the mobile terminal does not exceeds the maximum value if a state of the power control bit "0" continues.

On the other hand, in the IS-95B system, in order to perform data communication faster, a plurality of traffic channels for data communication can be assigned to one mobile terminal. It is assumed that in the IS-95B system, an existing traffic channel used in the IS-95A system is called a fundamental channel and a traffic channel added for data communication is called a supplemental channel. One fundamental channel is necessarily assigned to the mobile terminal during communication. The maximum of seven supplemental channels can be assigned to the mobile terminal during communication.

A diffusion code for the fundamental channel is different from that for the supplemental channel. On the other hand, the power control bit is inserted only to a forward fundamental channel. When a reverse supplemental channel is assigned, a diffusion unit for the fundamental channel and a plurality of diffusion units for the supplemental channel are set to one mobile terminal. Thus, the mobile terminal uses a plurality of traffic channels, thereby enabling the data communication.

Referring to FIG. 1, the fundamental channels and the reverse supplemental channel are assigned to a mobile terminal PS. When a signal is transmitted from the mobile terminal PS, a base station BS measures a receiving level or line quality of data transmitted from the mobile terminal PS through the fundamental channel. If the receiving level or line quality measured are compared with a target value and the compared result is then sufficient, the transmission power of the mobile terminal PS is controlled to decrease the transmission power. If the compared result is insufficient, the transmission power of the mobile terminal PS is controlled by using the power control bit to increase the transmission power.

If the mobile terminal PS is located far from the base station and the propagation loss of the radio line increases, the base station BS cannot receive the signal from the mobile terminal PS at the sufficient level or quality. In this case, the base station BS controls the transmission power of the mobile terminal PS to be increased by use of the power control bit to set the transmitted power to the sufficient receiving-level or receiving quality. Further, when the mobile terminal PS moves and the propagation loss of the radio line increases, the base station BS also controls the transmission power of the mobile terminal PS to be increased.

However, the transmission power of the mobile terminal PS has the upper limit and the transmission power of the mobile terminal PS cannot be increased though the base station instructs the increase in transmission power, as shown in FIG. 2. As a result, the base station BS cannot receive the reverse signal from the mobile terminal PS. If such a state continues, a call of the mobile terminal PS is disconnected, the mobile terminal PS continues the transmission of the maximum transmission power to increase the interference with the reverse signal of other mobile terminals.

SUMMARY OF THE INVENTION

Accordingly, it is an object of the present invention to decrease the disconnection ratio of calls of one mobile terminal PS and suppress the increase in interference with the reverse signal of another mobile terminal when the one mobile terminal PS during data communication is located far from a base station BS and the propagation loss of a radio line is increased.

In order to solve the problems, a radio communication system according to the present invention includes a base station which transmits a data signal to a mobile terminal through a forward channel (forward fundamental channel) and also transmits one of a first power control signal (a power control bit having a value "1") indicating the positive of a received signal from the mobile terminal and a second power control signal (a power control bit having a value "0") indicating the negative of the received signal in accordance with the positive or negative of the received signal through the forward channel, and a mobile terminal which transmits a data signal to the base station through a first reverse channel (reverse fundamental channel) indicating the existing traffic channel and a second reverse channel indicating a traffic channel added for data communication and controls an operation to increase a transmission power of the data signal to be transmitted to the base station when the second power control signal is received.

In the radio communication system, the mobile terminal includes a receiving unit for receiving the first and second power control signals, a transmission power control unit for controlling a power of the transmission signal of the reverse channel based on the first and second power control signal which are received by the receiving unit, a transmission control unit for monitoring whether or not a value of the transmission power controlled by the transmission power control unit exceeds a predetermined maximum value (maximum transmission-power value) and for transmitting the data signal to the base station only through the first reverse channel (reverse fundamental channel) when the transmission-power value reaches the maximum value and the second power control signal is continuously received for a predetermined time.

The transmission control unit has a counter for counting the number of the second power control signals to be continuously received by the receiving unit and transmits a signal through the first reverse channel when the counted value of the counter reaches a predetermined number.

The transmission control unit also has a timer for counting a continuous detecting time of the maximum transmission-power value and transmits a signal through the first reverse channel when the timer counts a predetermined time.

DESCRIPTION OF THE PREFERRED EMBODIMENTS

Figure 3:
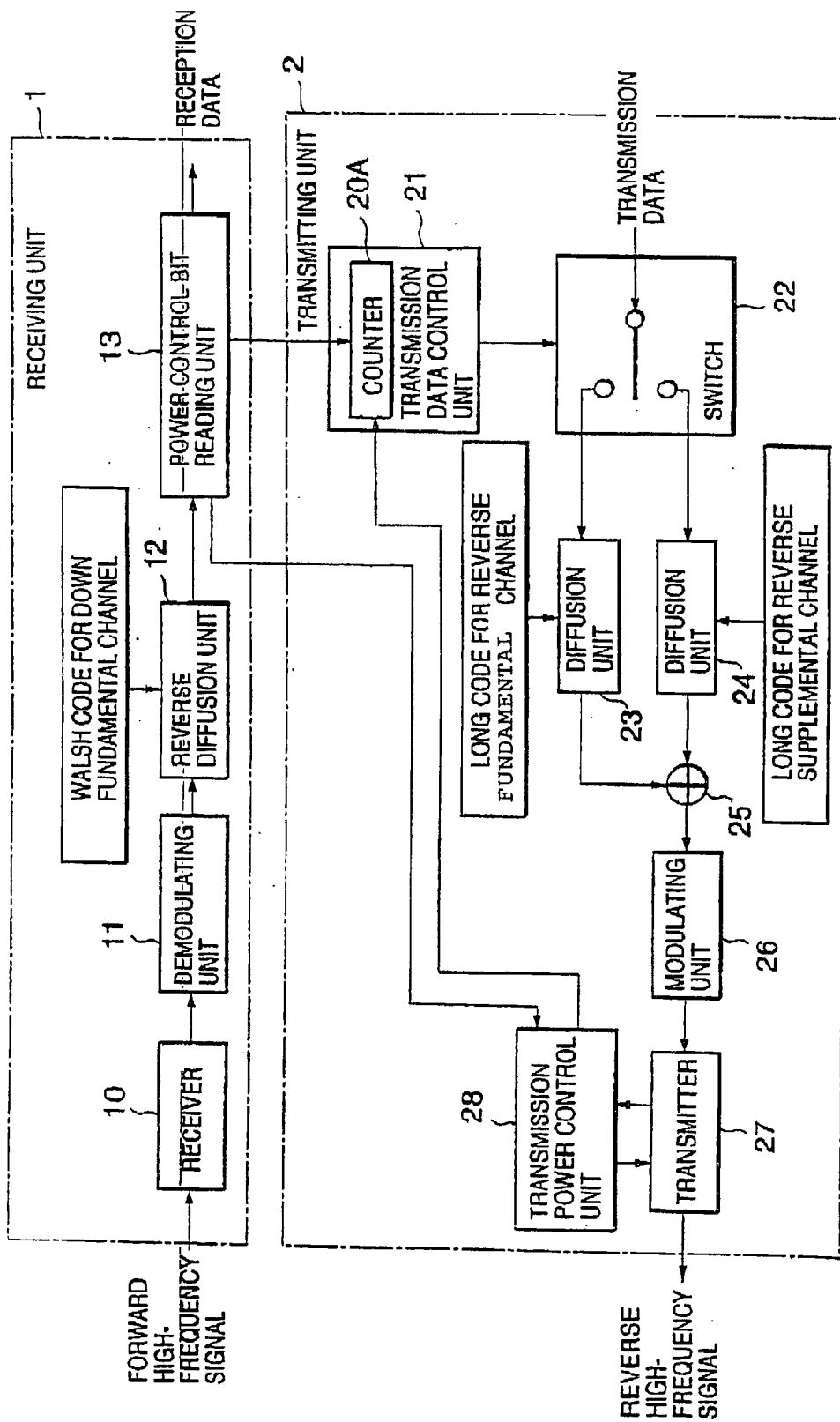
FIG. 3 is a block diagram of one structure of a mobile terminal constructing a radio communication system of the present invention.

A first embodiment of the present invention will be described with reference to the drawings hereinafter. FIG. 3 is a block diagram of one structure of a mobile terminal constructing a radio communication system of the present invention. The present radio communication system shows an example of the IS-95B specified by a TIA/EIA. The IS-95B system allocates two reverse communication channels (that is, one fundamental channel and one supplemental channel) to one mobile terminal thereby executing fast data communication.

As shown in FIG. 3, the mobile terminal comprises a receiving unit 1 and a transmitting unit 2. The receiving unit 1 has a receiver 10, a demodulating unit 11, a reverse-diffusion unit 12, and a power control bit reading unit 13. The transmitting unit 2 has a transmission data control unit 21 including a counter 20A, a switch 22, diffusion units 23 and 24, an adding unit 25, a modulating unit 26, a transmitter 27, and a transmission power control unit 28.

A description is given of the functional operations of the units constructing the mobile terminal with reference to FIG. 3. Referring to FIG. 3, the receiver 10 in the receiving unit 1 converts a high-frequency signal which is transmitted from a base station, which will be described later, by a frequency, and outputs a signal which is frequency-converted to the demodulating unit 11. The demodulating unit 11 converts the frequency-converted signal to be outputted from the receiver 10 into a base band signal, and outputs the base band signal to the reverse-diffusion unit 12. The reverse-diffusion unit 12 multiplies the base band signal which is outputted by the demodulating unit 11 by a Walsh code for a forward fundamental channel, reversely diffuses the signal of the forward fundamental channel, and, thereafter, outputs data of the reverse-diffused forward fundamental channel to the power control bit reading unit 13. The power control bit reading unit 13 reads data of the reverse-diffused forward fundamental channel to be outputted by the demodulating unit 12 and, thereafter, outputs the reception data.

The power control bit reading unit 13 reads a power control bit included in the data of the forward fundamental channel and outputs the read power control bit to the transmission data control unit 21 and the transmission power control unit 28 in the transmitting unit 1. When a transmission-power value of the mobile terminal to be outputted by the transmission power control unit 28 becomes maximum, the counter 20A in the transmission data control unit 21 counts the number of power control bits indicating "0" to be sequentially outputted by the power control bit reading unit 13. When the counted value of the counter 20A exceeds a threshold to be preset to the counter 2A, the transmission data control unit 21 controls the switch 22 and outputs transmission data only to the diffusion unit 23 to which a long code for the reverse fundamental channel is set.

If a transmission-power value of the mobile terminal to be outputted by the transmission power control unit 28 is equal to or less than a value obtained by dividing a maximum value by the number of traffic channels (the total of the number of fundamental channels and the number of supplemental channels), the transmission data control unit 21 switches the switch 22 and periodically outputs transmission data to the diffusion unit 23 to which the long code for the reverse fundamental channel is set or diffusion unit 24 to which the long code for the reverse supplemental channel is set. The diffusion unit 23 diffuses the transmission data to be outputted by the switch 22 by the long code for the reverse fundamental channel and outputs a base band signal to the adding unit 25.

The adding unit 25 adds the base band signal to be outputted by the diffusion unit 23 and the base band signal to be outputted by the diffusion unit 24 and outputs the added base band signal to the modulating unit 26. The modulating unit 26 modulates the added base band signal which is outputted by the adding unit 25 and outputs a modulation signal to the transmitter 27. The transmitter 27 converts the modulation signal to be outputted by the modulating unit 26 into a high-frequency signal, adjusts a transmission power in accordance with the transmission power control signal to be outputted by the transmission power control unit 28, and transmits the high-frequency signal to a radio interval. The transmitter 27 always outputs a value of the transmission power of the mobile terminal to the transmission power control unit 28. The transmission power control unit 28 discriminates a value of the power control bit which is outputted by the power control bit reading unit 13 and outputs the transmission power control signal to the transmitter 27. The transmission power control unit 28 outputs transmission-power value of the mobile terminal to be outputted by the transmitter 27 to the transmission data control unit 21.

That is, the transmission data control unit 28 in the transmitting unit 2 monitors the transmission power of the transmitter 27 and informs the transmission data control unit 21 on the value of the monitored transmission power. The transmission data control unit 21 monitors the transmission power of the mobile terminal to be outputted by the transmission power control unit 28 and the power control bit to be outputted by the power control bit reading unit 13. When the transmission power of the mobile terminal becomes maximum and, then, the power control bit is continuously set to be "0" for a predetermined time, the transmission data control unit 21 controls the switch 22. The transmission data is outputted only to the diffusion unit 23 to which the long code for the reverse fundamental channel is set. The diffusion unit 23 diffuses and outputs the transmission data inputted. Since the transmission data is not inputted to the diffusion unit 24, the diffusion unit 24 outputs no data. The adding unit 25 adds data which is outputted by the diffusion unit 23 and the diffusion unit 24. However, no data is outputted by the diffusion unit 24. Therefore, an amplitude of the base band signal to be inputted to the modulating unit 26 is smaller than that in the case of using the two diffusion units 23 and 24 and performing communication through the two traffic channel, and the transmission power of the transmitter 27 is also decreased.

At this time, the transmission power control unit 28 detects that the transmitter 27 transmits no signal having the maximum power and can increase the transmission power by the power control bit to be outputted by the power control bit reading unit 13. Consequently, all transmission powers of the mobile terminal do not change and, however, the transmission power per traffic channel can be increased. Although a communication speed is reduced, it is possible to reduce the number of disconnecting times of calls due to the deterioration of the reverse line.

As mentioned above, if the transmission power of the mobile terminal is maximum when the mobile terminal uses a plurality of reverse traffic channels and performs fast data-communication and the transmission power control signal from the base station instructs that the transmission power of the mobile terminal is continuously increased for a predetermined time, the mobile terminal can communicate data only through one traffic channel. In other words, according to the radio communication system of the present invention, the transmission power per channel can be increased, thereby preventing the disconnection of calls in the data communication.

Figure 4:
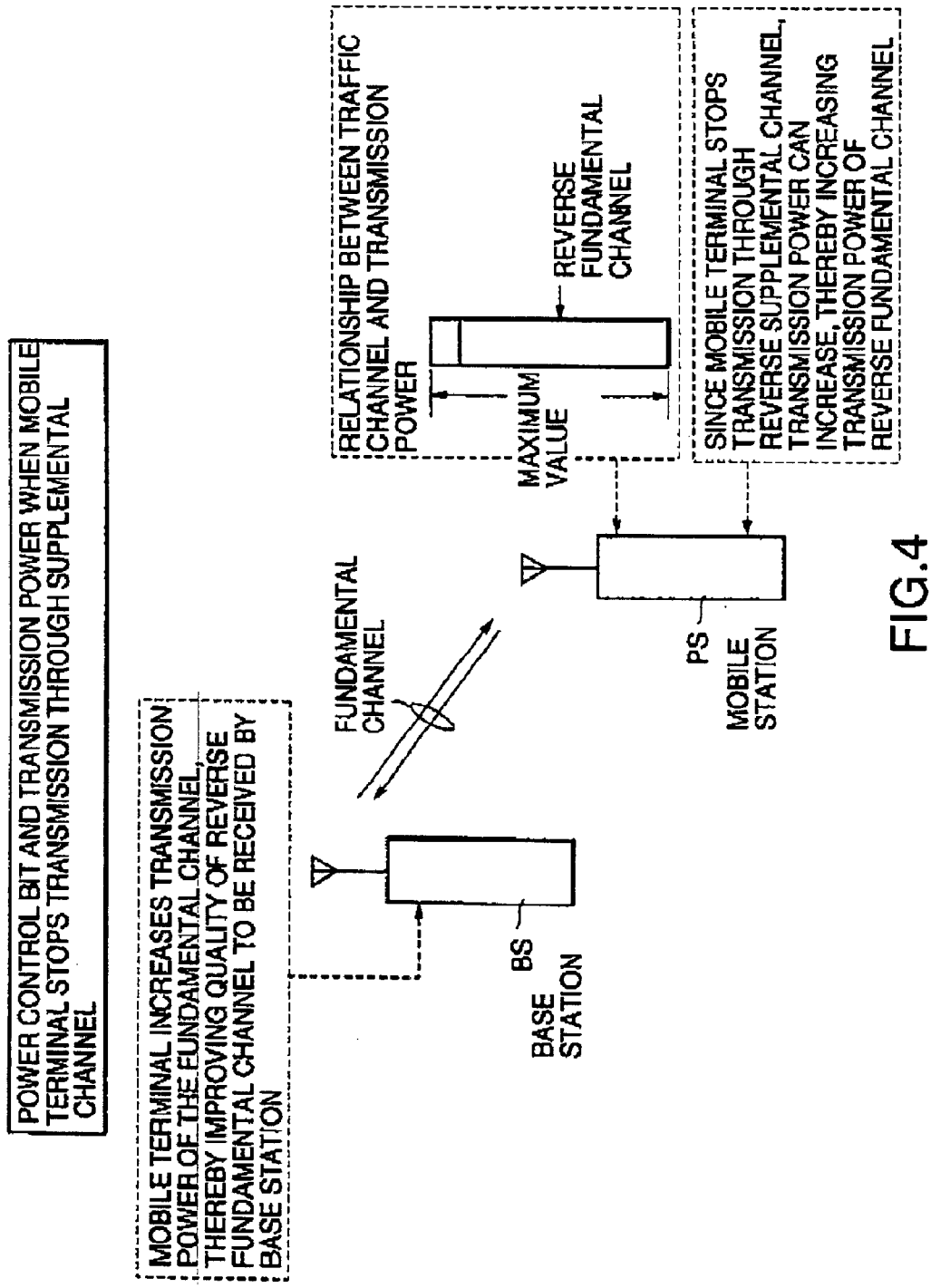
FIG. 4 is a diagram showing the relationship between the power control bit and the transmission power when the mobile terminal stops the transmission of an reverse supplemental channel.
Figure 5:
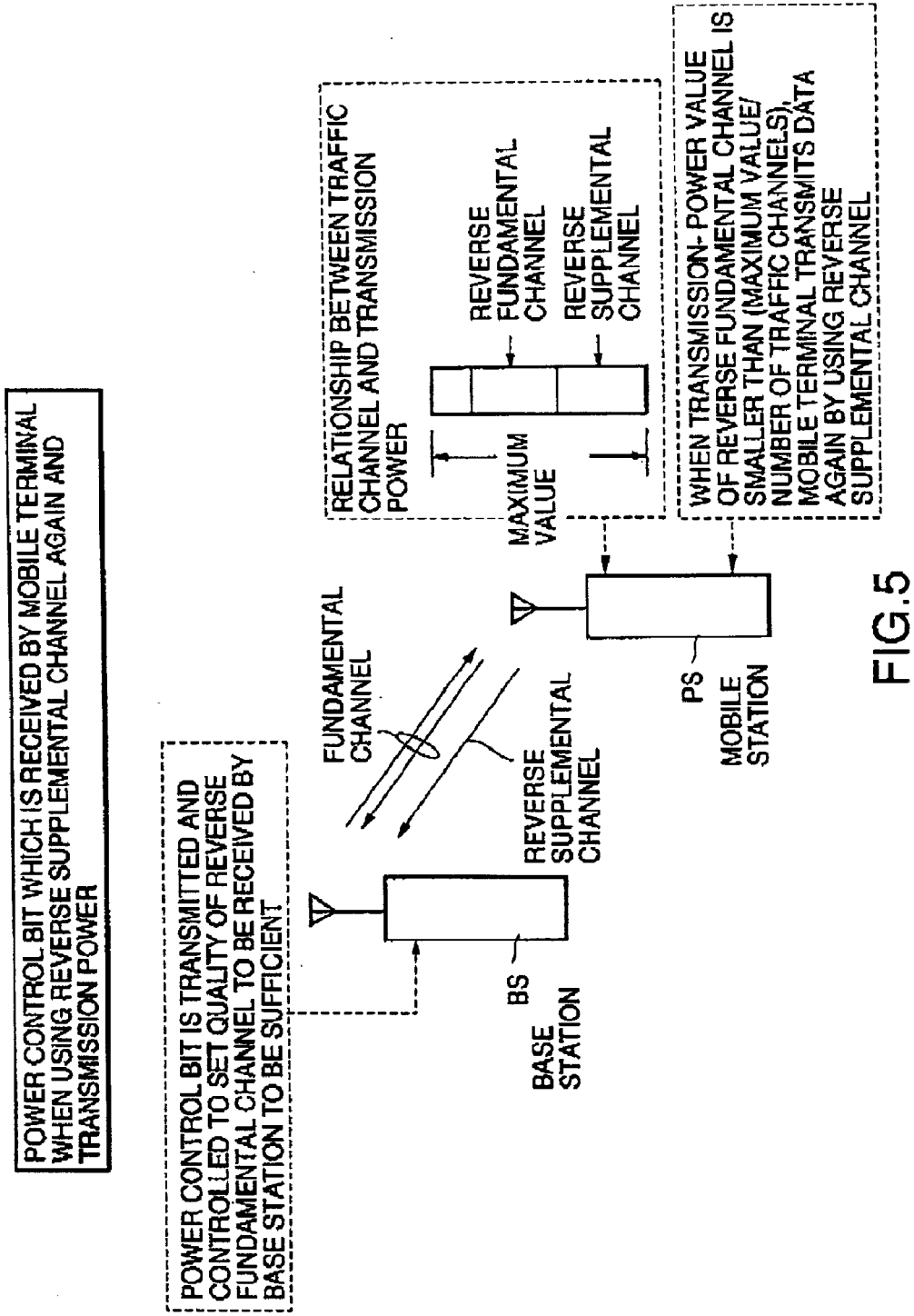
FIG. 5 is a diagram showing the relationship between the transmission power and the power control bit which is received when the mobile terminal uses an reverse supplemental channel again.
Figure 6:
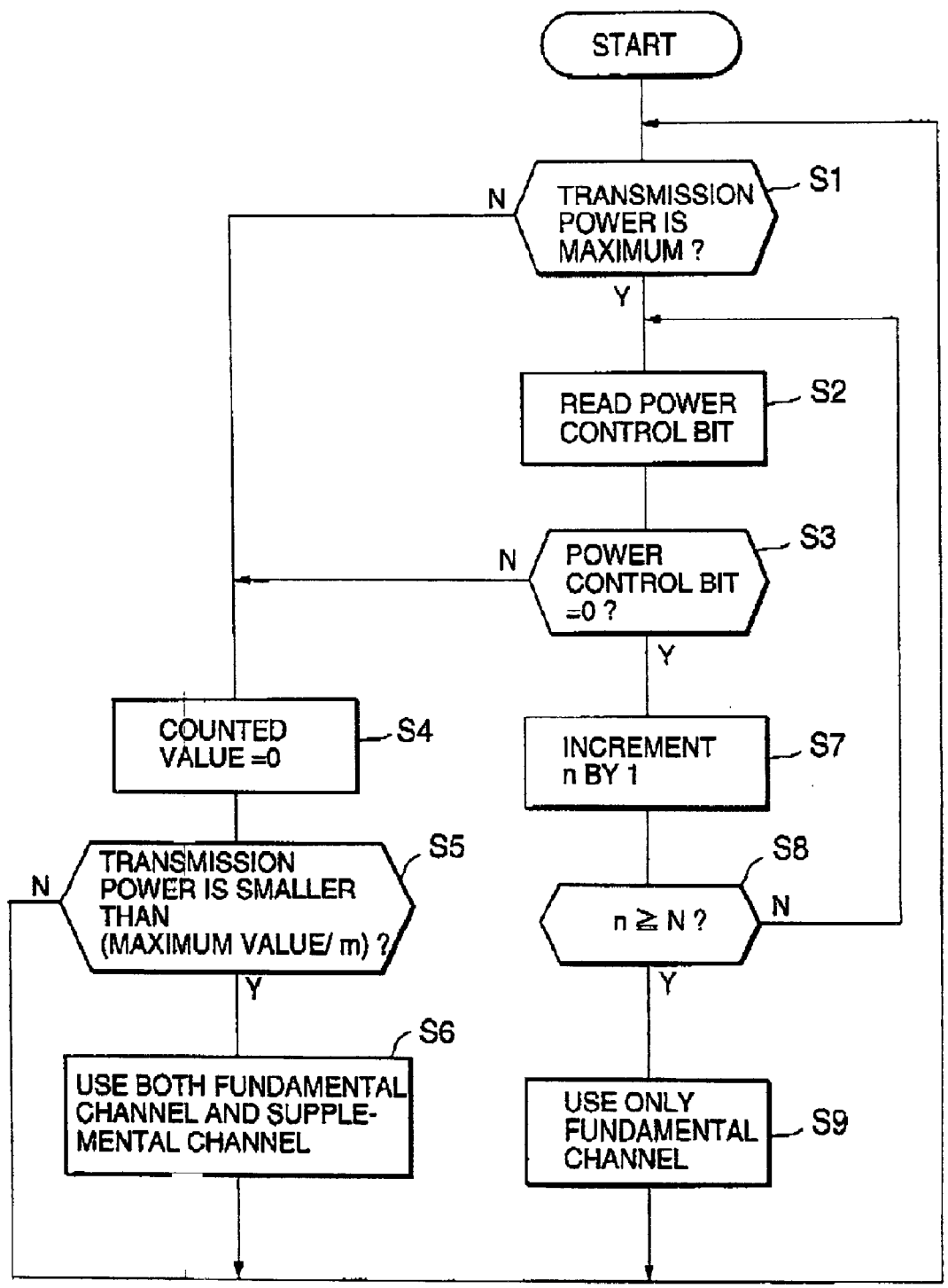
FIG. 6 is a flowchart showing the operation of a transmission data control unit in the mobile terminal in FIG. 1.

The operations of the radio communication system of the present invention will be described further in detail with reference to FIGS. 3 to 5. The radio communication system of the present invention comprises a base station BS and a mobile terminal PS as shown in FIGS. 4 and 6. FIGS. 4 and 5 show examples of the operations in the case in which two reverse communication channels (one fundamental channel and one supplemental channel) are assigned to the mobile terminal PS and fast data-communication is executed.

Figure 1:
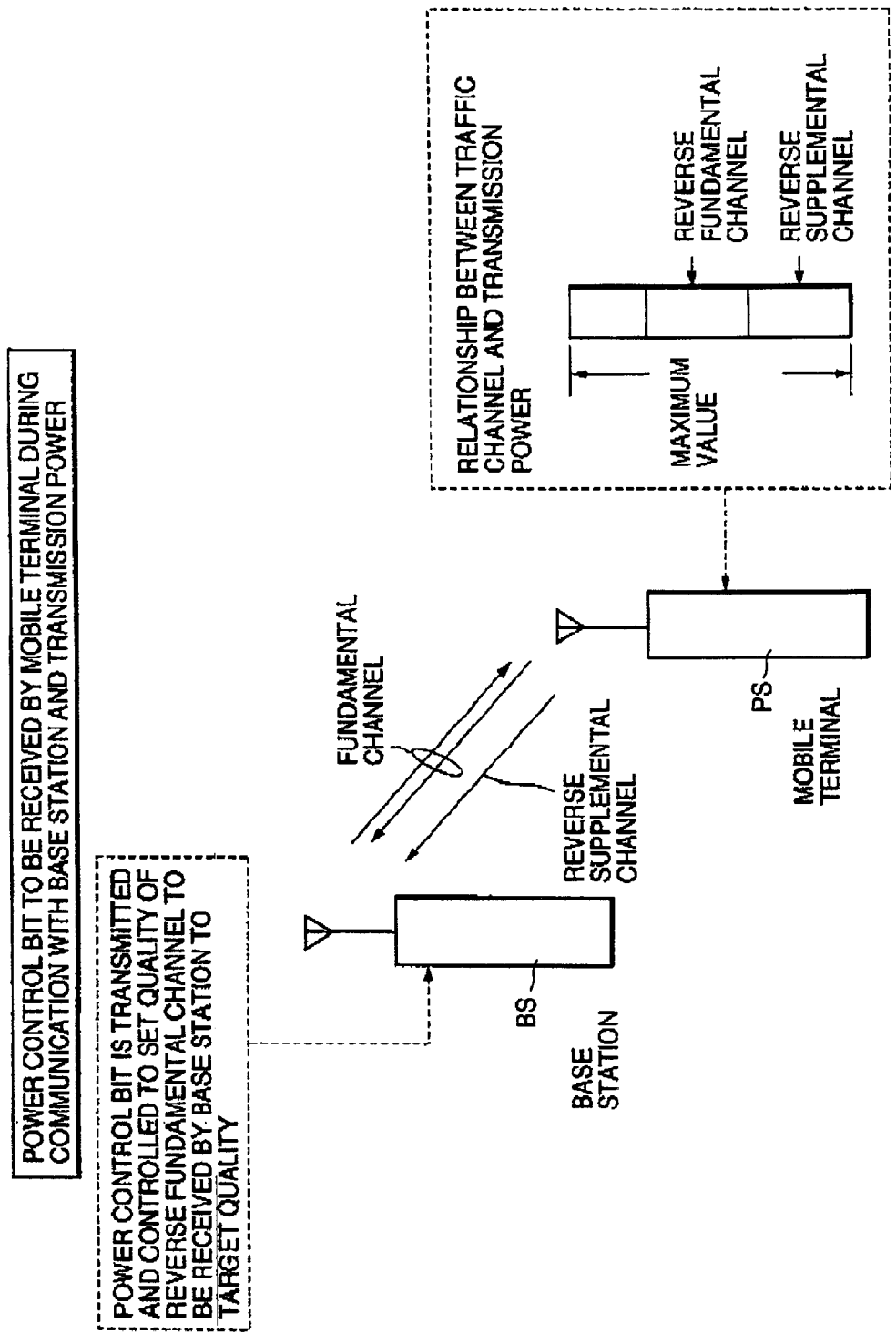
FIG. 1 is a diagram showing the relationship between a power control bit to be received by a mobile terminal communicating with a base station and a transmission power.

Herein, a signal through the forward fundamental channel to be transmitted from the base station BS includes not only the communication data as mentioned above in FIG. 1 but also the signal (the above power control bit) for controlling the transmission power of the mobile terminal PS. The mobile terminal PS receives the signal through the forward fundamental channel to be transmitted by the base station BS.

The signal received by the mobile terminal PS is frequency-converted by the receiver 10 shown in FIG. 3 as mentioned above, is further detected by the demodulating unit 11, and is reversely diffused by the diffusion unit 12. The power control bit reading unit 13 reads the power control bit among the reverse-diffused signals. The power control bit read is outputted to the transmission data control unit 21 and the transmission power control unit 28. The transmission power control unit 28 controls the transmitter 27 in accordance with the power control bit and adjusts the transmission power of the mobile terminal (if the power control bit is "0", the transmission power is increased and, if it is "1", the transmission power is decreased). The transmission data of the mobile terminal PS is distributed into the diffusion unit 23 and the diffusion unit 24 by the switch 22 controlled by the transmission data control unit 21. The distributed transmission-data is diffused as signals of the traffic channels (fundamental channel and supplemental channel). The transmission data diffused to the channels is added by the adding unit 25 and is modulated by the modulating unit 26. Thereafter, the modulated transmission-data is converted into the high-frequency signal and is transmitted by the transmitter 27.

The signal transmitted by the mobile terminal PS is received to the base station BS. The base station BS measures the receiving level or line quality of the fundamental channel to be transmitted by the mobile terminal PS. If the receiving level or line quality is compared with a target value and the compared result is then sufficient, the base station BS controls the transmission power of the mobile terminal PS by using the power control bit to reduce the transmission power. If it is insufficient, the base station BS controls the transmission power of the mobile terminal PS by using the power control bit to raise the transmission power. When the transmission power of the mobile terminal PS is normally controlled, the transmission power of the mobile terminal PS is smaller than the maximum value as mentioned above in FIG. 1. In this case, it is assumed that the transmission power of the fundamental channel is equal to that of the supplemental channel.

Herein, if the mobile terminal PS is located far from the base station BS and the propagation loss of the radio line increases, the base station BS cannot receive the signal of the mobile terminal PS having the sufficient level or sufficient quality. In this case, the base station BS controls the transmission power of the mobile terminal PS to be increased so as to obtain the sufficient level or sufficient quality. Further, if the mobile terminal PS moves and the propagation loss of the radio line increases, the base station BS also instructs the increase in transmission power of the mobile terminal PS as mentioned in FIG. 2. Incidentally, the transmission power of the mobile terminal PS has the upper limit. Therefore, though the base station BS instructs the increase in transmission power, the mobile terminal PS cannot increase the transmission power. Consequently, the base station BS cannot receive the reverse signal from the mobile terminal PS. In this case, the transmission power of the mobile terminal PS becomes maximum as described in FIG. 2, and both the transmission power of the fundamental channel and the transmission power of the supplemental channel become half of the maximum transmission power.

Figure 2:
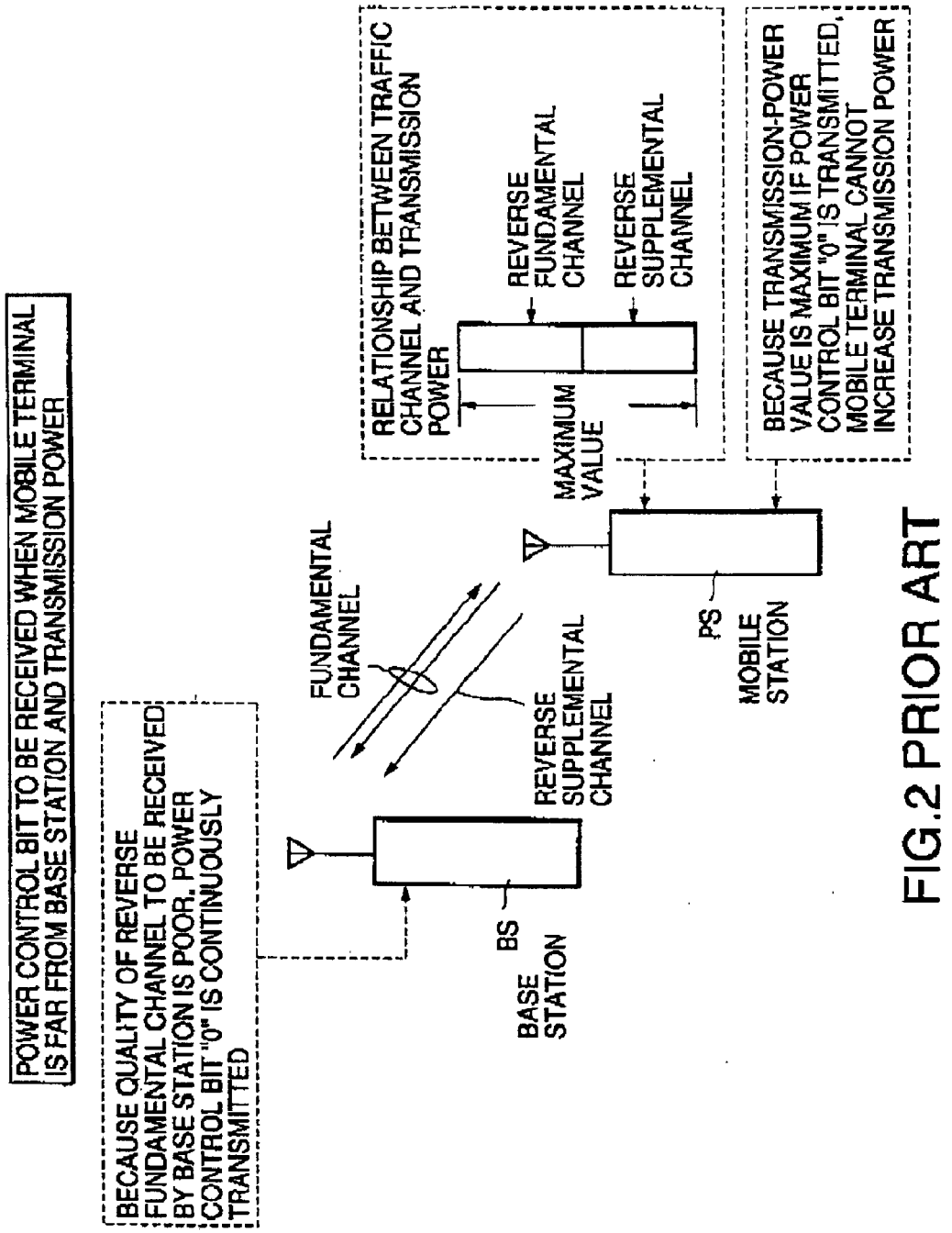
FIG. 2 is a diagram showing the relationship between the power control bit to be received when the mobile terminal is located far from the base station and the transmission power.

Accordingly, when the transmission-power value from the transmission power control unit 28 to be inputted to the transmission data control unit 21 is maximum, the transmission data control unit 21 starts to monitor the power control bit to be inputted by the power control bit reading unit 13. When the power control bit is "0" continuously for a predetermined time, the transmission data control unit 21 switches the switch 22 and controls the transmission data to be transmitted through the fundamental channel as shown in FIG. 2.

When the transmission data is inputted only to the diffusion unit 23 for fundamental channel, the diffusion unit 24 to which the long code for supplemental channel outputs no data. As a result, an amplitude of the base band signal to be inputted to the modulating unit 26 is reduced. Therefore, all powers to be transmitted by the transmitter 27 are also reduced and the transmitter 27 can increase the transmission power. Then, the base station BS instructs the mobile terminal PS to sequentially raise the transmission power. In accordance therewith, the mobile terminal PS increases the transmission power. If the receiving level or line quality to be received by the base station BS becomes sufficient, it is possible to continue the communication without disconnecting the call. In this case, the transmission power of the fundamental channel can be increased to the half value of the maximum value or more as shown in FIG. 4.

Next, a description is given of the operations in the case in which the mobile terminal PS is located far from the base station BS and communicates data only through the fundamental channel and, thereafter, the mobile terminal PS approaches the base station BS again and the propagation loss of the radio interval is reduced with reference to FIG. 5. When the mobile terminal PS approaches the base station BS, the propagation loss is decreased. Since the signal from the mobile terminal PS exceeds the receiving level or line quality as a target in the base station BS, the transmission power control unit 28 instructs the transmission power to be reduced. Herein, the transmission data control unit 21 in the mobile terminal PS monitors the transmission-power value to be outputted by the transmission power control unit 28. If a transmission-power value W is smaller than Wmax/m (where Wmax is a maximum transmission-power value and m is the number of traffic channels assigned to the mobile terminal PS), the transmission data control unit 21 controls the switch 22 and distributes the transmission data to the diffusion unit 23 to which the long code for fundamental channel is set and the diffusion unit 24 to which the long code for supplemental channel is set. After distribution, the data communication starts again through the two traffic channels as shown in FIG. 5. In this case, the transmission power of the mobile terminal PS is smaller than the maximum value as shown in FIG. 5.

Next, FIG. 6 is a flowchart showing the operation of the transmission data control unit 21 of the mobile terminal PS shown in FIG. 3. Herein, reference numeral n in the flowchart in FIG. 6 denotes a value which is counted by the counter 20A in the transmission data control unit 21 in FIG. 3. The counted value n of the counter 20A is incremented by 1 when the transmission-power value from the mobile terminal PS to be inputted to the transmission data control unit 21 becomes maximum and the power control bit transmitted to the transmission data control unit 21 by the power control bit reading unit 13 is "0". When the transmission power becomes not maximum, the power control bit becomes "0". Reference numeral N shown in FIG. 3 denotes a threshold of the counted value n for switching the switch 22 by the transmission data control unit 21 and for inputting the transmission data only to the diffusion unit 23 to which the long code for the reverse fundamental channel is set. Reference numeral m shown in FIG. 6 denotes the aforementioned number of traffic channels assigned to the mobile terminal PS (the total of the number of fundamental channels and the number of supplemental channels).

The operation of the transmission data control unit 21 will be described in detail based on the flowchart in FIG. 6. When the transmission-power value to be transmitted by the transmission power control unit 28 is inputted, the transmission data control unit 21 determines whether or not the transmission-power value is the maximum value (step S1). Herein, when the transmission-power value is not the maximum value, the value n of the counter 20A is set to be "0" in step S4. It is determined whether or not the transmission-power value from the transmission power control unit 28 is smaller than the (maximum value/m) (i.e., a value obtained by dividing the maximum transmission-power value by the number of traffic channels (step S5). If the transmission-power value is not smaller than the (maximum value/m), the processing routine returns to step S1 and the transmission-power value from the transmission power control unit 28 is then monitored. If the transmission-power value is smaller than the (maximum value/m) (if "Y" in step S5), the switch 22 is switched and the transmission data is periodically supplied to the diffusion unit 23 and the diffusion unit 24 (step S6). After a process for transmitting data to the base station BS, the processing routine returns to step S1 and the transmission power value from the transmission power control unit 28 is monitored again.

If the transmission-power value from the transmission power control unit 28 becomes maximum and the determination in step S1 becomes "Y", the power control bit read by the power control bit reading unit 13 is inputted (step S2). It is determined whether or not the inputted power control bit is "0" (step S3). Herein, if the power control bit is "1" and the determination in step S3 is "N", the value n of the counter 20A is set to be "0" (step S4). Thereafter, it is determined whether or not the transmission-power value from the transmission power control unit 28 is smaller than the (maximum value/m) (step S5). If the transmission-power value is smaller than the (maximum value/m), the switch 22 is switched, thereby performing a process for periodically supplying the transmission data to the diffusion unit 23 and the diffusion unit 24 (in other words, transmitting process using both the fundamental channel and the supplemental channel (step S6).

If the inputted power control bit is "0" and the determination in step S3 is "Y", the counted value n of the counter 20A is incremented by 1 (step S7). Subsequently, it is determined whether or not the counted value n is equal to or more than the threshold N (step S8). If the threshold N is larger than the counted value n of the counter 20A, the processing routine returns to step S2 and the power control bit "0" which is read by the power control bit reading unit 13 is sequentially inputted and counted. When the counted value n of the counter 20A is larger than the threshold N, the switch 22 is switched (step S9). By supplying the transmission data only to the diffusion unit 23, a process for transmitting data to the base station BS (in other words, transmitting process using only the fundamental channel) is performed. Thereafter, the processing routine returns to step S1, the transmission-power value from the transmission power control unit 28 is inputted again, and the inputted value is monitored.

When the transmission-power value from the transmission power control unit 28 becomes maximum, the power control bit "0" is sequentially inputted. When the signal from the mobile terminal PS reaches the receiving level or line quality as the target in the base station BS during counting and the power control bit "1" is transmitted ("N" in step S3), the processing routine proceeds to the above processes subsequent to step S4. That is, after the value n of the counter 20A is set to be "0", it is determined whether or not the transmission-power value from the transmission power control unit 28 is smaller than the (maximum value/m) in step S5. If the transmission-power value is smaller than the (maximum value/m), the switch 22 is switched in step S6, thereby executing the process for periodically supplying the transmission data to the diffusion unit 23 and the diffusion unit 24. The processing routine returns to step S1. If the transmission-power value is not smaller than the (maximum value/m), the processing routine promptly returns to step S1.

As mentioned above, if the transmission-power value from the transmission power control unit 28 is the maximum value, the transmission data control unit 21 inputs the power control-bit read by the power control bit reading unit 13. If the counted value n of the counter 20A for counting the power control bit "0" exceeds the threshold N, the transmission of data using the reverse supplemental channel is stopped. By switching to the data communication using only the reverse fundamental channel, the maximum transmission power of the reverse fundamental channel is increased. The base station BS can receive the data of the fundamental channel at the sufficient receiving level and line quality. Therefore, it is possible to reduce the disconnection ratio of calls of the mobile terminal PS which is communicating the data.

Although The base station BS does not receive the signal of the reverse fundamental channel and the reverse supplemental channel at the sufficient receiving level or sufficient line quality, by preventing the continuous transmission of the mobile terminal PS at the maximum transmission power using a plurality of traffic channels, it is possible to reduce the interference with the reverse signal to be supplied to another mobile terminal.

Figure 7:
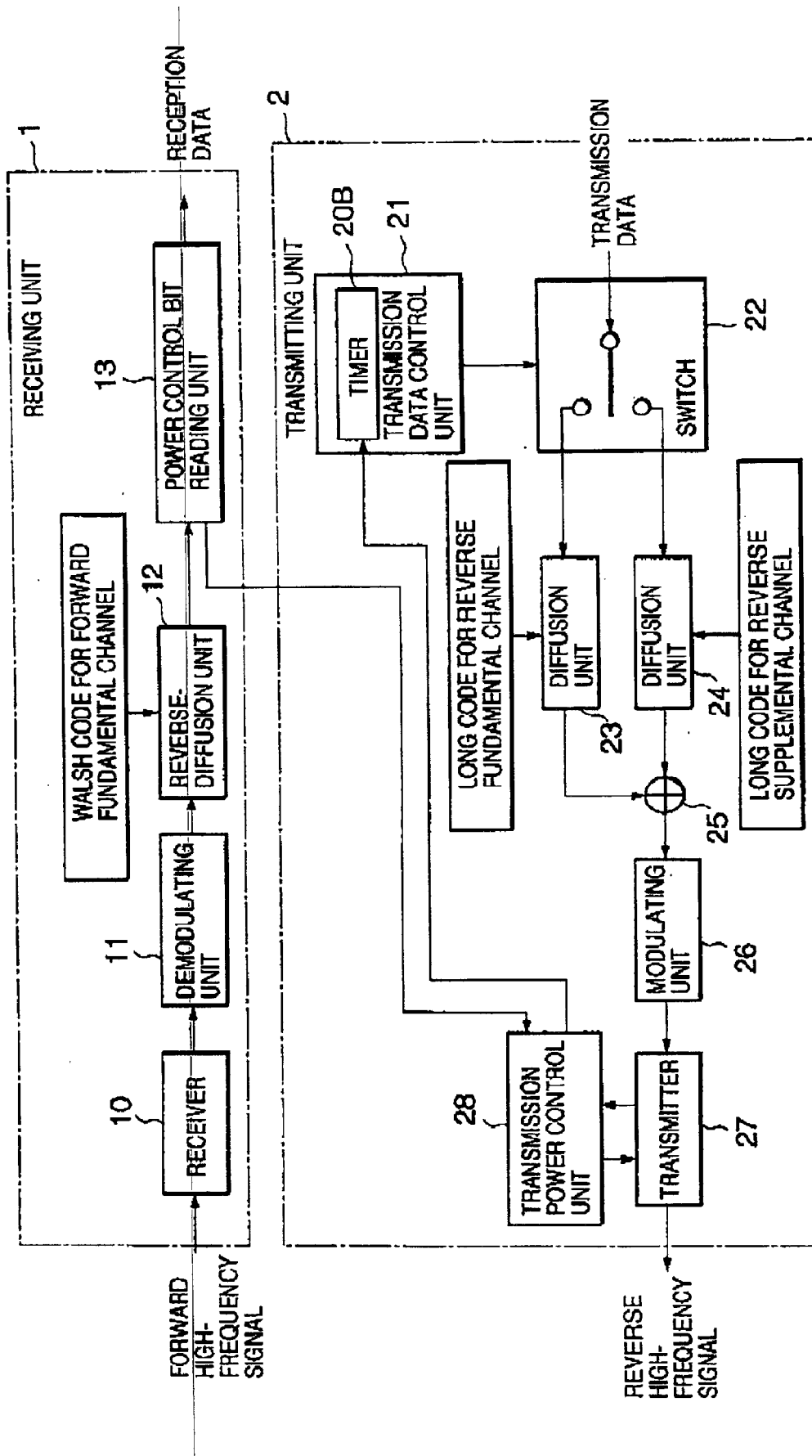
FIG. 7 is a block diagram showing another structure of the mobile terminal.

Next, FIG. 7 is a block diagram showing a mobile terminal PS according to a second embodiment of the present invention. The mobile terminal PS shown in FIG. 7 is different from the mobile terminal PS in FIG. 3 in that the counter 20A is deleted from the transmission data control unit 21 in the mobile terminal PS shown in FIG. 3 and, in place thereof, a timer 20B is provided. Except therefor, the mobile terminal PS in FIG. 7 is the same as that of the first embodiment.

When the transmission-power value of the mobile terminal PS to be inputted by the transmission power control unit 28 becomes maximum, the timer 20B of the transmission data control unit 21 operates. When the timer 20B becomes time-up, the transmission data control unit 21 switches 22 and connects the transmission data only to the diffusion unit 23 to which the long code for the reverse fundamental channel is set. Thereby, the data transmission starts by using only the fundamental channel.

If the transmission-power value of the mobile terminal PS to be outputted by the transmission power control unit 28 is smaller than the (maximum value/m), the transmission data control unit 21 switches the switch 22 and periodically supplies the transmission data to the diffusion unit 23 to which the long code for the reverse fundamental channel is set or diffusion unit 24 to which the long code for the reverse supplemental channel is set.

Figure 8:
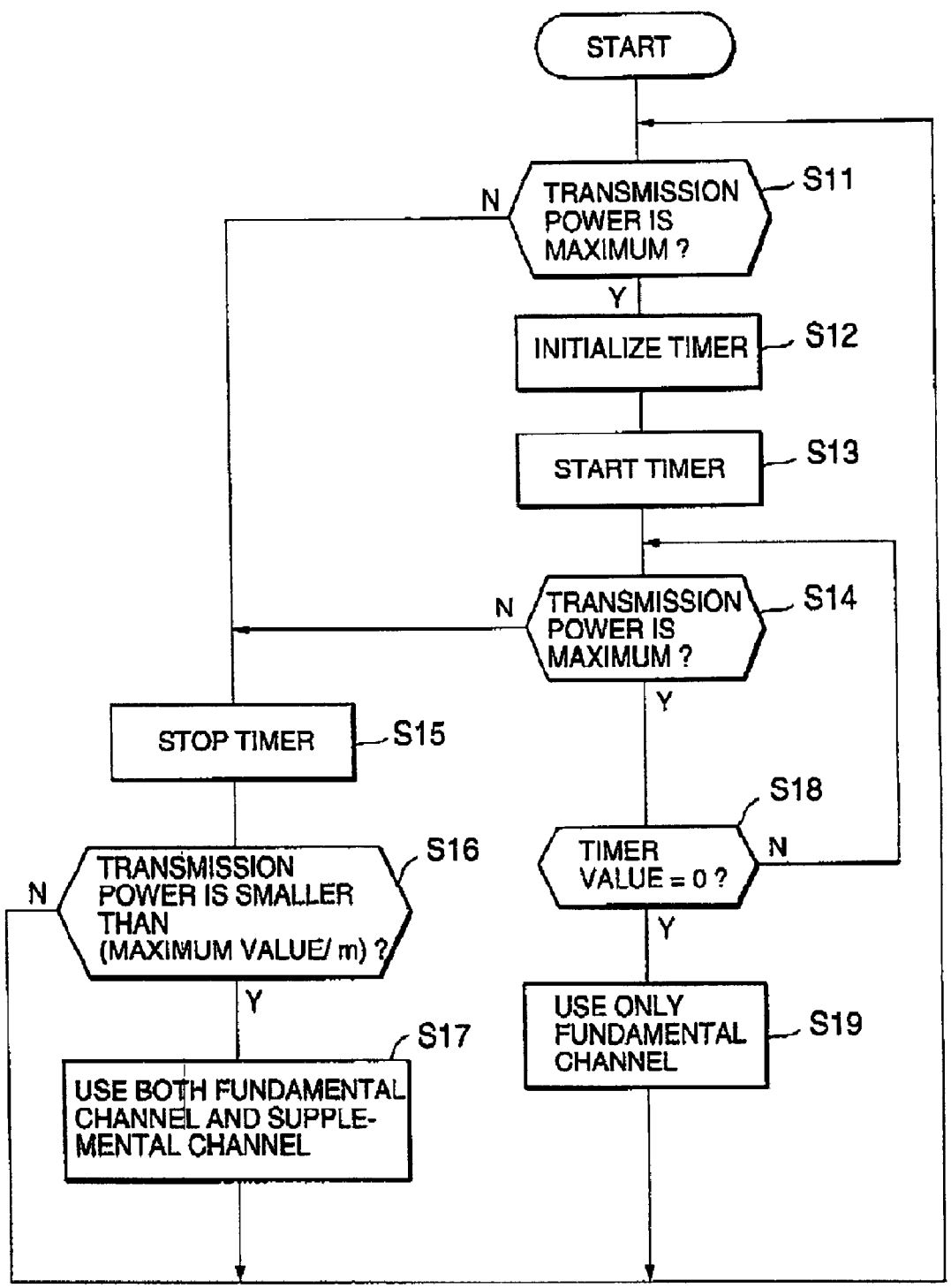
FIG. 8 is a flowchart showing the operation of the transmission data control unit in the mobile terminal shown in FIG. 5.

Next, a description is given of the operation of the transmission data control unit 21 of the mobile terminal PS shown in FIG. 7 with reference to a flowchart of FIG. 8. If the transmission-power value from the transmission power control unit 28 is inputted, the transmission data control unit 21 determines whether or not the transmission-power value is maximum (step S11). If the transmission-power value is not maximum, the timer 20A stops (step S15) and it is determined whether or not the transmission-power value inputted by the transmission power control unit 28 is smaller than the (maximum value/m) (step S16). If it is determined that the transmission-power value is not smaller than the (maximum value/m), the processing routine returns to step S11. The transmission data control unit 21 inputs the transmission-power value from the transmission power control unit 28 again and determines whether or not the transmission-power value is maximum. If the transmission-power value from the transmission power control unit 28 is smaller than the maximum value/m ("Y" in step S16), the switch 22 is switched (step S17), thereby executing a transmitting process using both the fundamental channel and the supplemental channel for periodically supplying the transmission data to the diffusion unit 23 and the diffusion unit 24. Thereafter, the processing routine returns to step S11.

If the transmission-power value from the transmission power control unit 28 is inputted and the transmission-power value becomes maximum ("Y" in step S11), the initialization to set an initial value to the timer 20B is performed (step S12). The timer 20B starts and a value of the timer 20B is subtracted (step S13). The transmission-power value is sequentially inputted by the transmission power control unit 28 and it is determined whether or not the transmission-power value sequentially becomes maximum (step S14).

If the transmission-power value becomes non-maximum, the timer 20B stops (step S15). Further, it is determined whether or not the transmission-power value inputted by the transmission power control unit 28 is smaller than the (maximum value/m) (step S16). If the transmission-power value is not smaller than the (maximum value/m), the processing routine returns to step S11. That is, the transmission-power value is inputted again by the transmission power control unit 28 and it is monitored whether or not the transmission-power value becomes maximum. If the transmission-power value is smaller than (maximum value/m) ("Y" in step S16), the switch 22 is switched, thereby performing a process for periodically supplying the transmission data to the diffusion unit 23 and the diffusion unit 24 (step S17). Thereafter, the processing routine returns to step S11.

If the transmission-power value inputted by the transmission power control unit 28 sequentially becomes maximum ("Y" in step S14), it is determined whether or not the value of the timer 20B is "0" as a result of the subtraction starting from step S13 (step S18).

If the value of the timer 20B is not "0", the transmission-power value from the transmission power control unit 28 is sequentially inputted and it is determined whether or not the transmission-power value becomes maximum (step S14). It is determined whether or not the value of the timer 20B is "0" (step S18). This determination is repeated (step S14 and step S18). If the value of the timer 20B is "0" while the transmission-power value from the transmission power control unit 28 becomes maximum and the determination whether or not the value of the timer 20B is "0" in step S18 is "Y", the switch 22 is switched (step S19) and the transmission data is supplied only to the diffusion unit 23, thereby performing a process for transmitting the transmission data to the base station BS (in other words, transmitting process using only the fundamental channel). Thereafter, the processing routine returns to step S11 and the transmission-power value from the transmission power control unit 28 is inputted again and is monitored. Incidentally, if the transmission-power value from the transmission power control unit 28 is decreased from the maximum value until the value of the timer 20B is "0", the signal from the mobile terminal PS reaches the target receiving level or target line-quality in the base station BS. In this case, the transmission power control unit 28 reduces the transmission power and, therefore, the processing routine shifts to the above-mentioned processes subsequent to step S15.

As described above, when the maximum value of the transmission-power value inputted by the transmission power control unit 28 continues for a period specified by the value of the timer 20A, the mobile terminal PS stops the transmission of data using the reverse supplemental channel and switches the operation to the data transmission using only the reverse fundamental channel.

As mentioned above, according to the present invention, in a radio communication system having a base station for transmitting a signal to a mobile terminal through a forward channel and for transmitting one of a first power control signal indicating the positive of a received signal from the mobile terminal and a second power control signal indicating the negative of the received signal in accordance with the positive or negative of the received signal through the forward-channel, and the mobile terminal for transmitting a signal to the base station through a first reverse channel and a second reverse channel and for increasing a power of the signal transmitted through the reverse channels when the second power control signal is received, the mobile terminal comprises a receiving unit for receiving the first and second power control signals, a transmission power control unit for controlling a power of the transmission signal of the reverse channels based on the first or second power control signal which is received, and a transmission control unit for transmitting the signal through the first reverse channel when the receiving unit receives the second power control signal continuously for a predetermined time in the case in which the maximum value of the transmission power is detected. Therefore, even when the mobile terminal during data communication is located far from the base station and the propagation loss of the radio line increases, it is possible to reduce the disconnection ratio of calls of the mobile terminal and also to suppress the increase in interference with the reverse signals of other mobile terminals.

The transmission control unit has a counter for counting the number of the second power control signals to be continuously received by the receiving unit, and also transmits a signal through the first reverse channel when the counted value of the counter reaches a predetermined value. Thereby, when the disconnection ratio of calls of the mobile terminal is decreased in the case in which the propagation loss of the radio line increases, the radio communication system can be realized with the simple construction.

If the maximum value of the transmission power is continuously detected for a predetermined time, the transmission data is transmitted through the first reverse channel, thereby reducing the disconnection ratio of calls of the mobile terminal when the propagation loss of the radio line increases.

The transmission control unit also has a timer for counting a continuous detecting time of the maximum transmission-power value and also transmits a signal through the first reverse channel when the timer counters a predetermined time. Therefore, if the disconnection ratio of calls of the mobile terminal is reduced when the propagation loss of the radio line increases, the radio communication system can also be realized with the simple construction.

What is claimed is:

1. A radio communication system comprising a base station and a mobile terminal, said base station transmitting a data signal to said mobile terminal through a forward channel and transmitting one of a first power control signal indicating the positive of a received signal from said mobile terminal and a second power control signal indicating the negative of said received signal in accordance with the positive or negative of said received signal, said mobile terminal transmitting the data signal to said base station through a first reverse channel indicating an existing traffic channel and a second reverse channel indicating a traffic channel added for data communication and controlling an operation to increase a transmission power of the data signal to be transmitted to said base station when said second power control signal is received;

wherein said mobile terminal comprises:

a receiving unit for receiving said first and second power control signals;

a transmission power control unit for controlling a power of the transmission signal of said first and second reverse channels based on said first and second power control signals which are received by said receiving unit; and a transmission control unit for monitoring whether or not a value of said transmission power controlled by said transmission power control unit exceeds a predetermined maximum value, counting a number of the second power control signals sequentially received by said receiving unit when said transmission-power value has reached said maximum value, and transmitting the data signal to said base station only through said first reverse channel when said transmission-power value reaches said maximum value, and a counted value of the number of the second power control signals exceeds a predetermined threshold.

2. A system as claimed in claim 1, wherein said first power control signal has a power control bit "0" and said second power control signal has a power control bit "1".

3. A system as claimed in claim 2, wherein said receiving unit has a power control bit reading unit for reading said power control bits "0" and "1".

4. A system as claimed in claim 1, wherein said transmission control unit has a counter for counting the number of the second power control signals to be continuously received by said receiving unit, and transmits said data signal only through said first reverse channel when a counted value of said counter exceeds a predetermined threshold.

5. A system as claimed in claim 1, wherein said first reverse channel is a reverse fundamental channel and said second reverse channel is a reverse supplemental channel.

6. A radio communication system comprising a base station and a mobile terminal, said base station transmitting a data signal to said mobile terminal through a forward channel and transmitting one of a first power control signal indicating the positive of a received signal from said mobile terminal and a second power control signal indicating the negative of said received signal in accordance with the positive or negative of said received signal, said mobile terminal for transmitting a data signal to said base station through a first reverse channel indicating an existing traffic channel and a second reverse channel indicating a traffic channel added for data communication and controlling an operation to increase a transmission power of the data signal to be transmitted to said base station when said second power control signal is received;

wherein said mobile terminal comprises:

a receiving unit for receiving said first and second power control signals;

a transmission power control unit for controlling a power of the transmission signal of said reverse channel based on said first and second power control signals which are received by said receiving unit; and a transmission control unit for monitoring whether or not a value of the transmission power controlled by said transmission power control unit exceeds a predetermined maximum value, counting a number of the second power control signals sequentially received by said receiving unit when said transmission-power value has reached said maximum value, and transmitting the data signal to said base station only through said first reverse channel when said transmission-power value reaches said maximum value and said maximum value of the transmission power is continuously detected for a predetermined time, and a counted value of the number of the second power control signals exceeds a predetermined threshold.

7. A system as claimed in claim 6, wherein said first reverse channel is a reverse fundamental channel and said second reverse channel is a reverse supplemental channel.

8. A mobile terminal in a radio communication system comprising a base station, said mobile terminal comprising:

a transmitting circuit which transmits a first reverse channel and a second reverse channel different from the first reverse channel through a reverse signal to the base station;

a receiving circuit, coupled to said transmitting circuit, which receives a power control signal directing to increase or decrease a transmission power of the reverse signal from the base station; and a controller, coupled to said transmitting circuit, which controls the transmission power of the reverse signal transmitted by said transmitting circuit on the basis of the power control signal, wherein said transmitting circuit stops transmitting the second reverse channel on the basis of the number of the power control signals, which increase the transmission power of the reverse signal, received by said receiving circuit while the transmission power of the reverse signal is maximum, wherein said controller counts a number of the power control signals, which increase the transmission power of the reverse signal, received by said receiving circuit while the transmission power of the reverse signal is maximum, said transmitting circuit stops transmitting the second reverse channel when the number of the power control signals counted by said controller is larger than a predetermined number.

9. A mobile terminal in a radio communication system comprising a base station, said mobile terminal comprising:

a transmitting circuit which transmits a first reverse channel and a second reverse channel different from the first reverse channel through a reverse signal to the base station;

a receiving circuit, coupled to said transmitting circuit, which receives a power control signal directing to increase or decrease a transmission power of the reverse signal from the base station; and a controller, coupled to said transmitting circuit, which controls the transmission power of the reverse signal transmitted by said transmitting circuit on the basis of the power control signal, wherein said transmitting circuit stops transmitting the second reverse channel on the basis of the number of the power control signals, which increase the transmission power of the reverse signal, received by said receiving circuit while the transmission power of the reverse signal is maximum, wherein said controller detects the transmission power of the reverse signal, and starts counting the number of the power control signals, which increase the transmission power of the reverse signal, when said controller detects the transmission power of the reverse signal is maximum.

10. A radio communication system comprising:

a base station and mobile terminal, wherein said mobile terminal transmits a first reverse channel and a second reverse channel different from the first reverse channel through a reverse signal to the base station;

said base station transmits a power control signal which directs to increase or decrease a transmission power of the reverse signal; and said mobile terminal receives the power control signal, controls the transmission power of the reverse signal on the basis of the power control signal received, and stops transmitting the second reverse channel on the basis of a number of the power control signals, which increase the transmission power of the reverse signal, received while the transmission power of the reverse signal is maximum, wherein said mobile terminal counts the number of the power control signals, which increase the transmission power of the reverse signal, received while the transmission power of the reverse signal is maximum, and stops transmitting the second reverse channel when the number of the power control signals counted is larger than a predetermined number.

11. A radio communication system according to claim 10, wherein said mobile terminal monitors the transmission power of the reverse signal, and starts counting the number of the power control signals, which increase the transmission power of the reverse signal, when said mobile terminal detects the transmission power of the reverse signal is maximum.

* * * * *